L. B. NIELSEN.
DOOR RETAINER.
APPLICATION FILED AUG. 10, 1911.
1,064,760.
Patented June 17, 1913.
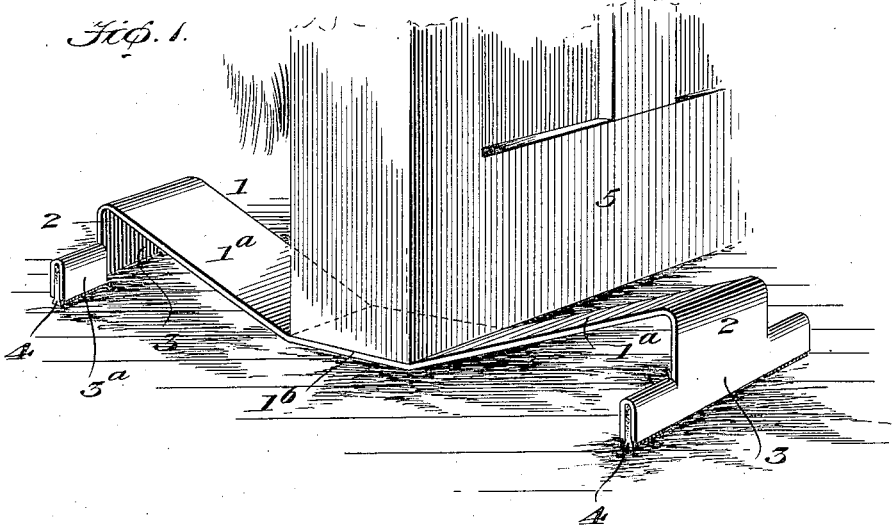
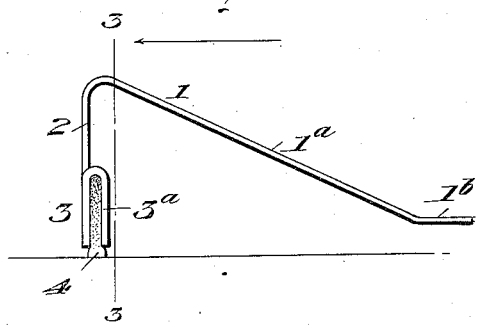
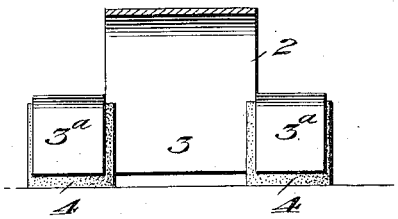
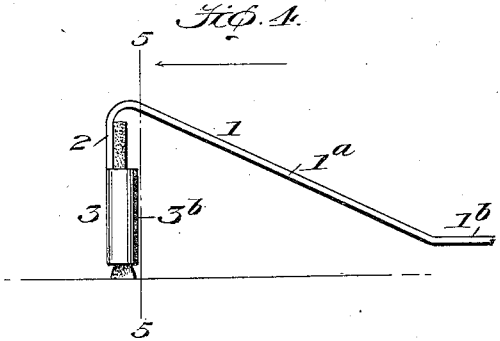
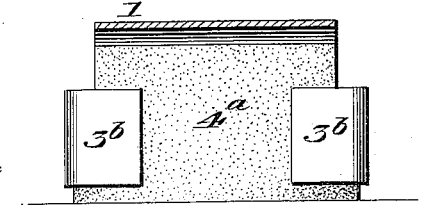
Witnesses
Inventor
L. B. Nielsen
His Attorney

UNITED STATES PATENT OFFICE.

LAURITZ B. NIELSEN, OF NEWBURGH, NEW YORK.

DOOR-RETAINER.

1,064,760.  Specification of Letters Patent.  Patented June 17, 1913.

Application filed August 10, 1911. Serial No. 643,357.

*To all whom it may concern:*

Be it known that I, LAURITZ B. NIELSEN, a citizen of the United States, residing at Newburgh, county of Orange, and State of New York, have invented certain new and useful Improvements in Door-Retainers, of which the following is a specification.

This invention relates to door retainers.

The present invention relates to that class of door retainers which are adapted to be placed on the floor and by engagement therewith and with the door, hold the latter.

The invention has for its object the provision of a simple, light, inexpensive, strong and durable door retainer made from flat or sheet metal, formed or bent in a new manner and provided with rebent parts holding suitable friction material, strips or pieces, such as rubber, rubber fabric, felt, etc., adapted to engage the floor to prevent the retainer from slipping.

Unlike retainers heretofore known, my retainer is formed of a single piece of flat sheet metal, whereby it is exceedingly cheap of manufacture and possesses great strength and durability.

The invention is set forth in detail hereinafter and the novel features are recited in the appended claim.

In the accompanying drawings:—Figure 1 is a perspective view showing the retainer in use; Fig. 2, a side elevation of a part of the retainer; Fig. 3, a cross section on line 3—3, Fig. 2; Fig. 4, a view like Fig 2, showing a modification; and Fig. 5, a cross section on line 5—5, Fig. 4.

The retainer is made of a single piece of flat or sheet metal cut out in any preferred manner, having a body 1, legs 2, feet 3, and friction material 4. Preferably the body 1 is formed of similar inclines $1^a$ joined by a flat part $1^b$, and the height of the legs 2, feet 3 and friction material 4 is such that the flat part $1^b$ is disposed only slightly above the floor so that it can be slipped under the outer end of the door 5, it not being necessary for the retainer to actually bind upon the lower edge of the door, because the door is limited to a very slight movement on account of engaging the inclined parts $1^a$ should it move.

Referring to Figs. 1, 2 and 3, the feet 3 are provided with rebent or doubled parts $3^a$ which clamp against the feet, the pieces of friction material 4 which project below the feet and bear on the floor, being adapted to prevent any slipping of the device. The friction material 4 may be of rubber, rubber fabric, felt, or any other suitable material, and it may extend entirely across the device or be of approximately the same, or a little greater or less than the width of the rebent parts $3^a$.

In Figs. 4 and 5, the rebent parts $3^b$ are disposed horizontally instead of vertically and clamp against the legs 2 and feet 3, the friction material $4^a$.

Having slipped the retainer under the door, any tendency of the door to move is resisted by its engagement with the surfaces $1^a$, causing the friction material 4 to bear all the more firmly on the floor so that the retainer does not slip.

Having thus described my invention, what I claim as new and desire to secure by Letters Patent, is:—

As a new article of manufacture, a door retainer consisting of a continuous piece of broad, flat sheet metal having downwardly bent legs provided with frictional contact feet and with a rigid central permanently depressed portion, intermediate said legs, of a height adapting it to slip readily beneath the door and having portions on each side of the center thereof inclined at a sufficiently small angle to allow the door to ride up the same and become wedged thereby.

In testimony whereof, I hereunto affix my signature in presence of two witnesses.

LAURITZ B. NIELSEN.

Witnesses:
  PATRICK REILLY,
  JOHN J. PERROTT.